US008860741B1

(12) United States Patent
Juffa et al.

(10) Patent No.: US 8,860,741 B1
(45) Date of Patent: Oct. 14, 2014

(54) GRAPHICS PROCESSOR WITH MEMORY MANAGEMENT UNIT AND CACHE COHERENT LINK

(75) Inventors: Norbert Juffa, San Jose, CA (US); Stuart F. Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2283 days.

(21) Appl. No.: 11/608,436

(22) Filed: Dec. 8, 2006

(51) Int. Cl.
*G09G 5/36* (2006.01)
(52) U.S. Cl.
USPC .............................. 345/557; 345/530; 345/531
(58) Field of Classification Search
USPC .............................. 711/141; 345/506; 714/776
See application file for complete search history.

(56) References Cited

U.S. PATENT DOCUMENTS

| 2006/0066623 | A1 * | 3/2006 | Bowen ........................... 345/506 |
| 2006/0080513 | A1 * | 4/2006 | Beukema et al. .............. 711/141 |
| 2007/0033494 | A1 * | 2/2007 | Wenger et al. ................ 714/776 |

OTHER PUBLICATIONS

Buck, Ian et al., "Brook for GPUs: stream computing on graphics hardware", International Conference on Computer Graphics and Interactive Techniques, ACM SIGGRAPH 2004 Papers, 2004, pp. 777-786.*
Lefohn, A.E. et al., "A streaming narrow-band algorithm: interactive computation and visualization of level sets", Visualization and Computer Graphics, IEEE Transactions on vol. 10, Issue 4, Jul.-Aug. 2004, pp. 422-433.*
Stokes, Jon, "PCIe 2.0 spec to speed coprocessors", ars technica, Oct. 10, 2006, http://arstechnica.com/hardware/news/2006/10/7945.ars.*
Nebojsa Novakovic, ATI's Stream Computing—a good reason to get bought, the Inquirer, Oct. 6, 2006.

* cited by examiner

*Primary Examiner* — Phi Hoang
(74) *Attorney, Agent, or Firm* — Kilpatrick Townsend & Stockton LLP

(57) ABSTRACT

In contrast to a conventional computing system in which the graphics processor (graphics processing unit or GPU) is treated as a slave to one or several CPUs, systems and methods are provided that allow the GPU to be treated as a central processing unit (CPU) from the perspective of the operating system. The GPU can access a memory space shared by other CPUs in the computing system. Caches utilized by the GPU may be coherent with caches utilized by other CPUs in the computing system. The GPU may share execution of general-purpose computations with other CPUs in the computing system.

15 Claims, 4 Drawing Sheets

GRAPHICS PROCESSOR WITH MEMORY MANAGEMENT UNIT AND CACHE COHERENT LINK

BACKGROUND OF THE INVENTION

In a conventional desktop personal computer system with multiple central processing units (CPUs), each of the multiple CPUs includes a core configured to execute an instance of an operating system (OS) such as Microsoft Windows. A single image of the OS is run across all the cores, i.e. symmetric multiprocessing (SMP). Each of the CPUs is coupled via a memory management unit (MMU), typically a hardware circuit, to a shared memory space. In concert with the OS, the MMU provides seamless sharing of dynamically allocated memory space (both shared physical memory and shared virtual memory address space) among the multiple CPUs.

In addition, each of the multiple CPUs typically contains a cache, circuitry, and appropriate protocols (e.g., MESI protocol) for maintaining cache coherence. Cache coherence generally allows one CPU to update a location in shared memory and all other CPUs to be made aware of the update. Cache coherence allows the multiple CPUs to share processing loads, since each CPU can operate on current data regardless of whether the data is resident in cache or in memory coupled to the CPU, in memory coupled to some other CPU, or in some other CPU's cache.

BRIEF SUMMARY OF THE INVENTION

In a conventional computing system with one or more CPUs, a graphics processor (or graphics processing unit, GPU) is typically loosely coupled to CPUs in the system, for example via a Peripheral Component Interconnect Express (PCI Express) link. The GPU is considered a slave to the CPUs since historically GPUs have provided only graphics processing functions.

However, an appropriately configured GPU may execute general-purpose computation programs (also referred to herein as "compute class" programs), as described in currently-pending, commonly-assigned U.S. patent application Ser. No. 11/305,178, filed Dec. 15, 2005, entitled "Parallel Data Processing systems and Methods Using Cooperative Thread Arrays," U.S. patent application Ser. No. 11/312,002, filed Dec. 19, 2005, entitled "Pushbuffer Launching of Processor Threads," U.S. patent application Ser. No. 11/433,310, filed May 11, 2006, entitled "Maximized Memory Throughput on Parallel Processing Devices," and U.S. patent application Ser. No. 11/424,511, filed Jun. 15, 2006, entitled "Fast Fourier Transforms and Related Transforms using Cooperative Thread Arrays," the disclosure of which are incorporated by reference herein for all purposes.

By executing compute class programs, the GPU may perform general-purpose computations and may share in computations with other CPUs in the computing system. Further, because a high-performance GPU may be configured to compute at very high rates (e.g. with closely coupled high speed memories, highly parallel architecture, and high internal clock speeds), a state of the art GPU might provide general-purpose computations at a rate of about 100-200 GFLOPs, whereas a state of the art CPU might provide general-purpose computations at a rate of only about 10-20 GFLOPS. Thus, a state of the art GPU can provide 10× or more computational performance than a CPU.

A limitation in conventional computing systems is that the GPU is typically dealt with as a slave or "second class citizen" by the OS, which prevents the GPU from efficiently sharing in computations with other CPUs in the computing system. Generally, a conventional GPU is considered a PCI Express client such that the OS takes control over memory access by the GPU; for compute class processing, for example, the OS generally controls data loaded into a frame buffer coupled to the GPU, allocates to the GPU a special portion of system memory, and pushes commands and/or data to the GPU via a pushbuffer. Once the GPU has completed general-purpose computation processing, the GPU conventionally copies processed data from the frame buffer to system memory so that the CPU can access the processed data. Thus, sharing general-purpose computational work between the GPU and the CPU in a conventional computing system typically incurs an expensive exchange of information, where data is copied back and forth between memories local to the GPU and system memory that is shared by CPUs in the system. Generally, what shared memory there is in the computing system is not transparent from the perspective of both the CPU and the GPU, and the GPU has to copy data from its local memories to system memory so that CPU can read the data.

In contrast to a conventional computing system in which the GPU is treated as a slave, systems and methods are provided herein that allow the GPU to be treated as if it were a peer from the perspective of other CPUs in the system. For example, by including in the GPU a memory management unit and CPU core configured to execute an operating system in the GPU for memory management functions, the GPU can access shared memory space in the computing system as if the GPU were yet another CPU. Further, by configuring caches in the GPU to be coherent with caches utilized by other CPUs in the computing system, data may be shared between the GPU and other CPUs in the computing system. Accordingly, the GPU may provide general-purpose computations shared with other CPUs in the computing system as an equal partner or peer.

In a first aspect, the GPU includes one or more processing engines configured to execute compute class programs, a memory management unit configured to couple the graphics processor to a memory, and a core configured to execute an operating system. The operating system is configured to control the memory management unit and allocate memory space to the one or more compute class programs. In various embodiments, the memory management unit may be compatible with an x86 architecture ("x86-compatible"). The core may execute an operating system based upon Microsoft Windows, Linux, or other conventional operating systems. A cache may be coupled to the memory management unit, the cache configured to be coherent with a cache of a central processing unit coupled to the graphics processor.

In another aspect, a system comprises a central processing unit having a first cache, a memory coupled to the central processing unit, and a graphics processor. The graphics processor includes one or more processing engines configured to execute one or more compute class programs, a memory management unit configured to couple the graphics processor to the memory, and a core configured to execute an operating system. The operating system is configured to allocate space in the memory to the one or more compute class programs.

In another aspect, a system on chip comprises one or more processing engines configured to execute one or more compute class programs; a central processing unit configured to execute an operating system configured to allocate space in the memory to the one or more compute class programs; and a memory management unit configured to couple the system on chip to a memory.

The following detailed description together with the accompanying drawings will provide a better understanding of the nature and advantages of the present invention.

DETAILED DESCRIPTION OF THE INVENTION

Mechanisms for general-purpose computing with a graphics processing unit (GPU) are described in currently-pending, commonly-assigned U.S. patent application Ser. No. 11/305,178, filed Dec. 15, 2005, entitled "Parallel Data Processing systems and Methods Using Cooperative Thread Arrays" and U.S. patent application Ser. No. 11/312,002, filed Dec. 19, 2005, entitled "Pushbuffer Launching of Processor Threads," incorporated by reference herein. As described therein, a graphics processing unit can be configured to execute "compute class programs" to offload general-purpose processing tasks from a central processing unit (CPU).

Figure 1:
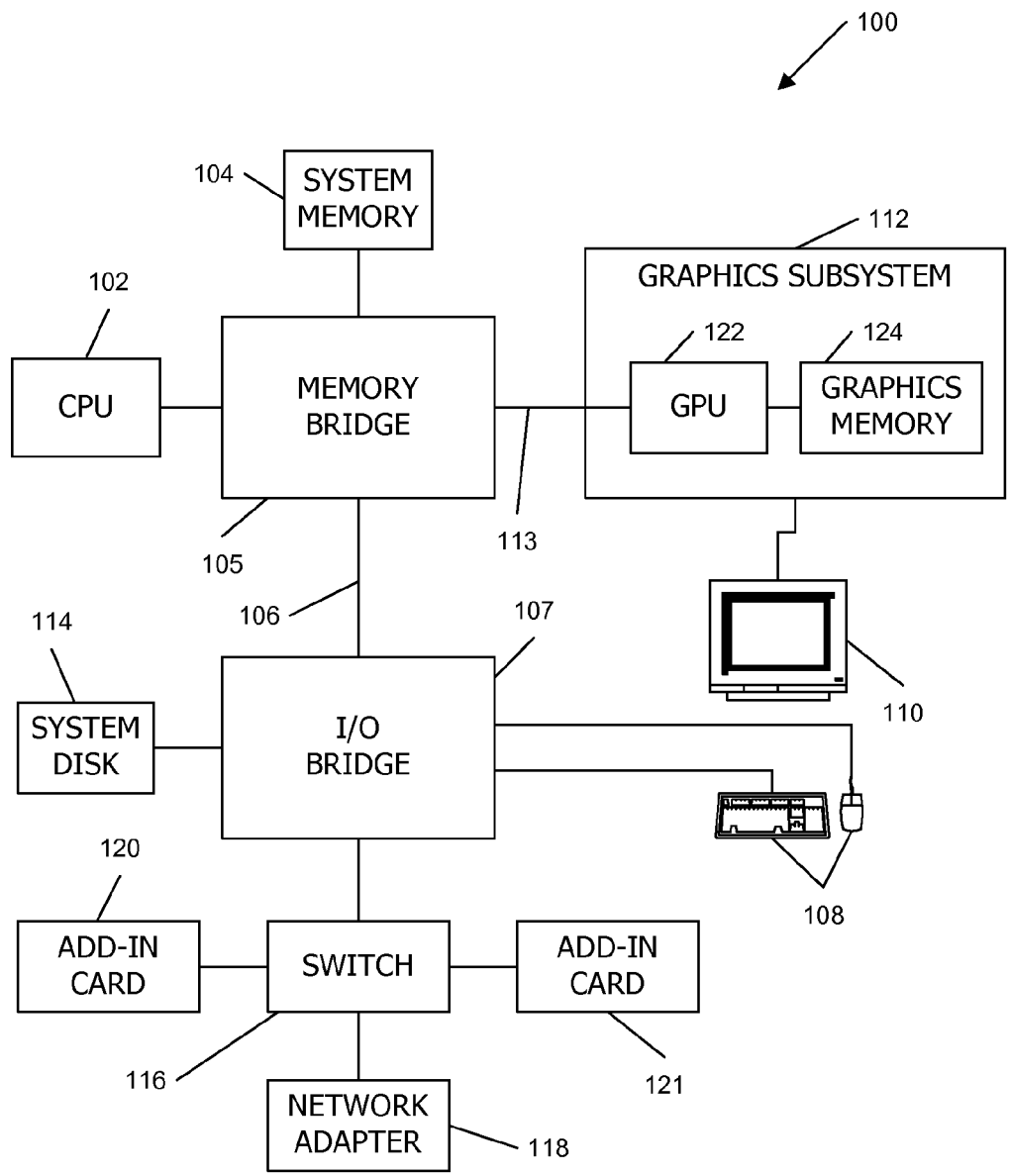
FIG. 1 is a block diagram of a computer system.

FIG. 1 is a block diagram of a computer system 100. Computer system 100 includes a central processing unit (CPU) or control processor 102 and a system memory 104 communicating via a communications path that includes a memory bridge 105. Memory bridge 105 (e.g. a Northbridge chip) is connected via a communication path 106 to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105. Visual output is provided on a pixel based display device 110 (e.g., a CRT or LCD based monitor) operating under control of a graphics subsystem 112 coupled to memory bridge 105 via communication path 113, which may be implemented using, e.g., PCI Express (PCI-E), Accelerated Graphics Port (AGP), or any other point-to-point or bus protocol. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107.

Graphics processing subsystem 112 includes a number N of parallel or graphics processing units (GPU) 122 and memories 124, which may be implemented, e.g., using one or more integrated circuit devices such as programmable processors, application specific integrated circuits (ASICs), and memory devices. Each GPU 122 may execute general parallel processing applications, or be configured to perform various tasks related to generating pixel data from graphics data supplied by CPU 102 and/or system memory 104 via memory bridge 105 and bus 113, interacting with memories 124 to store and update pixel data, and the like. For example, GPU 122 may generate pixel data from 2-D or 3-D scene data provided by various programs executing on CPU 102. Unless otherwise stated herein, the use of the singular (i.e., "GPU 122") is intended to include multiples.

In some embodiments, GPU 122 includes a plurality of multithreaded, general purpose computational cores that are coupled to a very high performance memory subsystem 124, whose bandwidth is about an order of magnitude greater than the bandwidth that is provided by system memory 104 of typical x86 architecture CPUs. As the cores of GPU 122 offer both integer and floating-point operations, and control flow constructs such as branches, subroutine calls and returns in addition to data handling capabilities, GPU 122 can be used to offload general purpose computational work from CPU 102. Benefited by multiple cores and multi-threading in GPU 122 in some embodiments, the instruction issue rate of GPU 122 may exceed the instruction issue rate of x86 architecture CPUs such as CPU 102 by approximately an order of magnitude or more.

Conventionally, GPU 122 and CPU 102 typically have address spaces that are both physically and logically separate from each other, which can require frequent copying of data between the two devices. In order for transfers of data to be somewhat efficient, a GPU direct memory access (DMA) engine may be used, but this may require that system memory 104 coupled to CPU 102 is contiguous and pinned to specific physical addresses. There may be multiple pieces of system memory 104 mapped for access by GPU 122, but the number of such mappings is typically small, and memory is mapped as a single, physically contiguous block rather than as much more flexible collection of potentially thousands of (physically non-contiguous) pages.

In addition, there may be alignment restrictions to be met. For example, when GPU 122 operates on plug-ins to existing software (e.g. Photoshop, ILOG CPLEX, or Mathematica), code that interfaces to GPU 122 generally has to deal with memory objects allocated elsewhere in the application, requiring that data first be copied to an intermediate CPU memory buffer before it can be DMAed to GPU 122. The need for an intermediate copy (i.e., double buffering) may arise from issues such as: (a) a given object to be transferred is generally unlikely to be stored in a physically contiguous memory required for DMA transfers, and (b) the object may not fulfill address alignment restrictions required for DMA transfers. Such issues in coupling of GPU 122 to CPU 102 present obstacles to exploiting the raw computational performance of GPU 122.

Further, cache coherence protocols may be another limiting factor. Conventional GPUs today do not include caches in the sense of a CPU cache, and typically utilize frame buffer memory, multiple discontinuous caches, or internal registers (locations separate from system memory) for cache-like functions. A conventional GPU can snoop caches of a CPU via PCI Express, but only in one direction. For example, CPU 102 might make a request to system memory 104, and GPU 122 can access the response based on whether a line is dirty within the cache of CPU 102 using frontside interface functionality of PCI Express (i.e., the data for satisfying a system memory access across PCI-Express initiated by the GPU could be delivered either from system memory or one of the CPU caches, depending on which entity contains the latest version). However, the reverse is not true; there is currently no mechanism for a CPU to probe a line that might be dirty in a GPU cache.

Therefore, various embodiments described herein include an memory management unit (MMU) compatible with x86 architecture in GPU 122, and/or one or more cache-coherent links attached to GPU 122. In this fashion, GPU 122 can appear from the outside as another x86 CPU with a cache-coherent link and can interface with other x86 CPUs having cache-coherent links. A heterogeneous multiprocessor system is thus provided where each processing device (CPU or GPU) is coupled to its own memory, but each processing device can access the memory of other devices via the cache coherent link(s). Further, all processors can work in a single unified memory space, reducing or eliminating the need for copying data between CPU and GPU. In addition, by making the MMU on the GPU x86-compatible, handling of the heterogeneous multiprocessor system by standard x86-based operating systems such as Windows and/or Linux is simplified.

Figure 2:
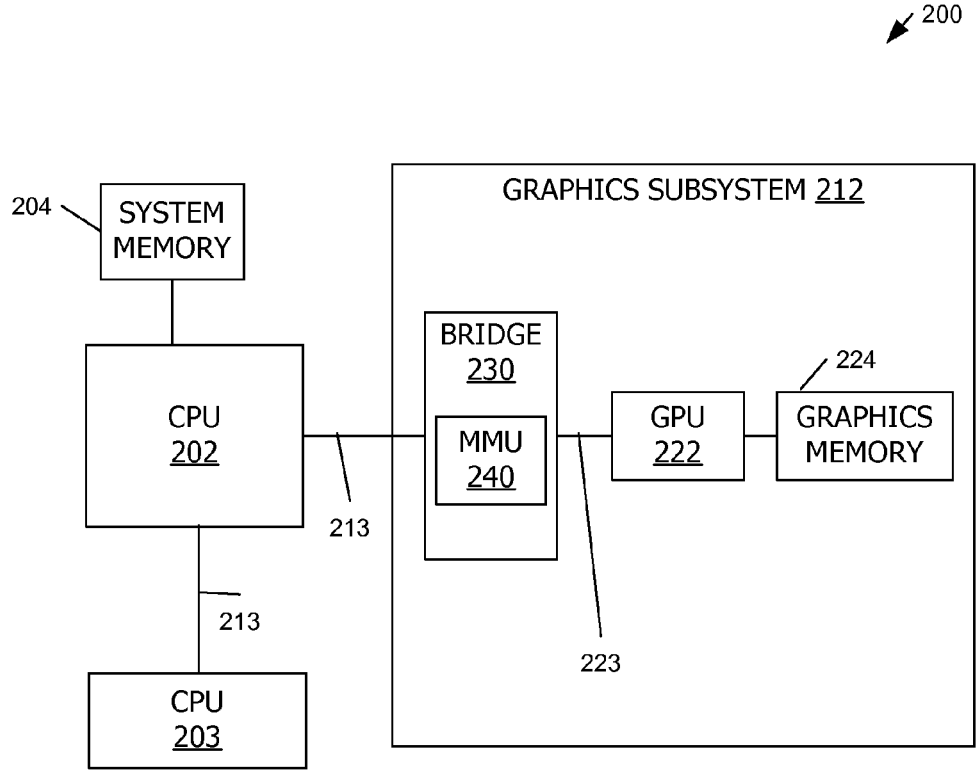
FIG. 2 is a generalized block diagram showing interfaces between one or more CPUs and a GPU in a computer system, according to an embodiment of the present invention.

FIG. 2 is a generalized block diagram showing interfaces between one or more CPUs and GPU 222 in a computer system 200, according to an embodiment of the present invention. Various conventional I/O devices (e.g., system disk, add-in cards, and associated interfaces of the sort described with respect to FIG. 1) are omitted from FIG. 2 for the sake of clarity to focus on processor interfaces in computer system 200. Although described as a single GPU 222, there may be multiple GPUs in GPU 222.

In this embodiment, the one or more CPUs (CPU 202 and optional CPU 203) comprise AMD Opteron processors. The Opteron processor includes a Direct Connect Architecture for input and output (I/O) and a shared 64-bit address space which allows CPU 202 to connect directly to system memory 204 (e.g., DRAM) through an integrated memory controller (not shown). In addition, CPU 202 is connected through a HyperTransport link (not shown) to a high performance I/O subsystem. Further, each CPU (e.g., CPU 202) may be directly connected to other CPUs (e.g., optional CPU 203) through a cache-coherent variant of HyperTransport ("cHT") interfaces 213, which allows support of a cache-coherent multi-CPU memory access protocol.

Although the present embodiment is described as utilizing AMD Opteron processors and HyperTransport interfaces, persons of ordinary skill in the art will recognize that there are a number of processors and interfaces (e.g., an Intel Coherent Scalable Interconnect or Common System Interface (CSI)) that provide similar functionality that may be used to advantage based upon the present disclosure.

As depicted in FIG. 2, graphics subsystem 212 includes high performance graphics memory 224 coupled to GPU 222. In some embodiments, graphics memory 224 is closely coupled to GPU 222, for example by being physically closely located to GPU 222 and/or being soldered to the printed circuit board (PCB) to which GPU 222 is mounted. Such mechanisms for close coupling enable high performance in graphics subsystem 212.

In addition, graphics subsystem 212 includes a "legacy" link 223 (e.g., PCI Express or AGP link) from GPU 222 to bridge chip 230. Bridge chip 230 includes an x86-compatible MMU 240 and cache coherent link. Bridge chip 230 directly interfaces to CPU 202 and/or CPU 203 via HyperTransport link 213.

MMU 240 is configured such that once programmed, code (e.g., Linux, a real time OS (RTOS), or other OS) used for a CPU MMU may be reused for MMU 240. MMU 240 need not be x86-compatible, but is x86-compatible in some embodiments to simplify coding for Windows OS and to take advantage of the fact that approximately 90% of desktop PCs or servers are based on x86 architecture. In contrast to conventional I/O MMUs or commercially available peripheral chips with MMU functionality that are typically one-off designs specifically tuned for specific functions, MMU 240 described herein is extensible. For example, MMU 240 may have new page table entries, a directory, the ability to switch page directory base addresses (e.g. to accommodate different processes), and so on. Such extensible features of MMU 240 may be stored in internal registers of GPU 222 or in graphics memory 224 in some embodiments.

As described in co-pending applications incorporated by reference herein, GPU 222 may comprise a massively parallel multithreaded machine that includes a number of processing engines configured to execute multiple concurrent threads. However, GPU 222 may comprise a variety of processing architectures, including any sequential single processors, parallel processors, or multithreaded processors.

Thus in some embodiments, GPU 222 has multiple parallel processing engines each capable of supporting multiple concurrent threads. The threads may be advantageously executed in SIMD (single instruction, multiple data) groups with one thread of the group being associated with each processing engine. A single instruction unit issues an instruction to an entire SIMD group in parallel, and each processing engine executes the instruction in the context of its thread of the current SIMD group; instructions for different SIMD groups can be issued in any order. By executing each instruction in the appropriate context, each processing engine executes one thread in each of multiple concurrent SIMD groups.

In some embodiments, CPU 202, CPU 203, and system memory 204 may be housed on a motherboard inside computer system 200, with graphics subsystem 212 housed on a daughterboard coupled to the motherboard via a pluggable connector. Providing graphics subsystem 212 on a daughterboard meets the needs of system integrators by providing pluggable interfaces, e.g. in the form of sockets or slots. In some embodiments, the daughterboard connector comprises an HTX connector or variant thereof. The HTX connector is defined by the HyperTransport consortium for use with HyperTransport links such as HyperTransport link 213. The HTX connector is mechanically similar to the PCI Express connector but rotated by 180 degrees, and shares similar electrical properties to the PCI Express interface.

In contrast to a conventional computing system in which the GPU is treated as a slave, GPU 222 may advantageously be treated as if it were a peer to CPUs 202 and/or 203 in computer system 200. For example, by including MMU 240 in graphics subsystem 212, GPU 222 can access shared memory space in system memory 204 with CPU 202 and/or CPU 203 as if GPU 222 were yet another CPU. Further, by configuring caches in GPU 222 to be coherent with caches utilized between CPU 202, CPU 203, and/or other CPUs in the computing system, data may be shared by GPU 222 and other CPUs in the computing system as if GPU 222 were yet another CPU. Accordingly, the GPU may provide general-purpose computations shared with other CPUs in the computing system as an equal partner or peer.

In some embodiments, GPU 222 could be used as a very powerful coprocessor sharing address space with CPU 202 and/or 203 but would remain under control of driver software executing on one or more of CPUs 202 or 203 in computer system 200.

Advantageously, the configuration described with respect to FIG. 2 provides flexibility and ease of manufacture, by allowing use of a commercially available GPU 222 that is designed to interface to a legacy link (such as PCI Express) while providing the unified address space and cache coherence desired for high performance computing applications shared across a number of processors. As compared to embodiments described below having higher levels of integration, however, the embodiments described with respect to FIG. 2 may (but need not) consume relatively more board real estate, may provide somewhat lower performance due to additional latency (e.g., buffering and/or control overhead) introduced by bridge chip 230, and may support only a simplified coherency model (e.g. simple invalidate model) due to limitations imposed by legacy link 223.

A further potential advantage is that graphics memory 224 is typically faster (up to 10× in some embodiments) than system memory 204, but the difference in speed of the memory subsystems is typically not an issue. Conventional schemes may be applied to allow for non-uniform memory access speed (e.g., 1-hop, 2-hop, 3-hop latencies that may incur delays of 20 ns up to 100 ns or more).

Figure 3:
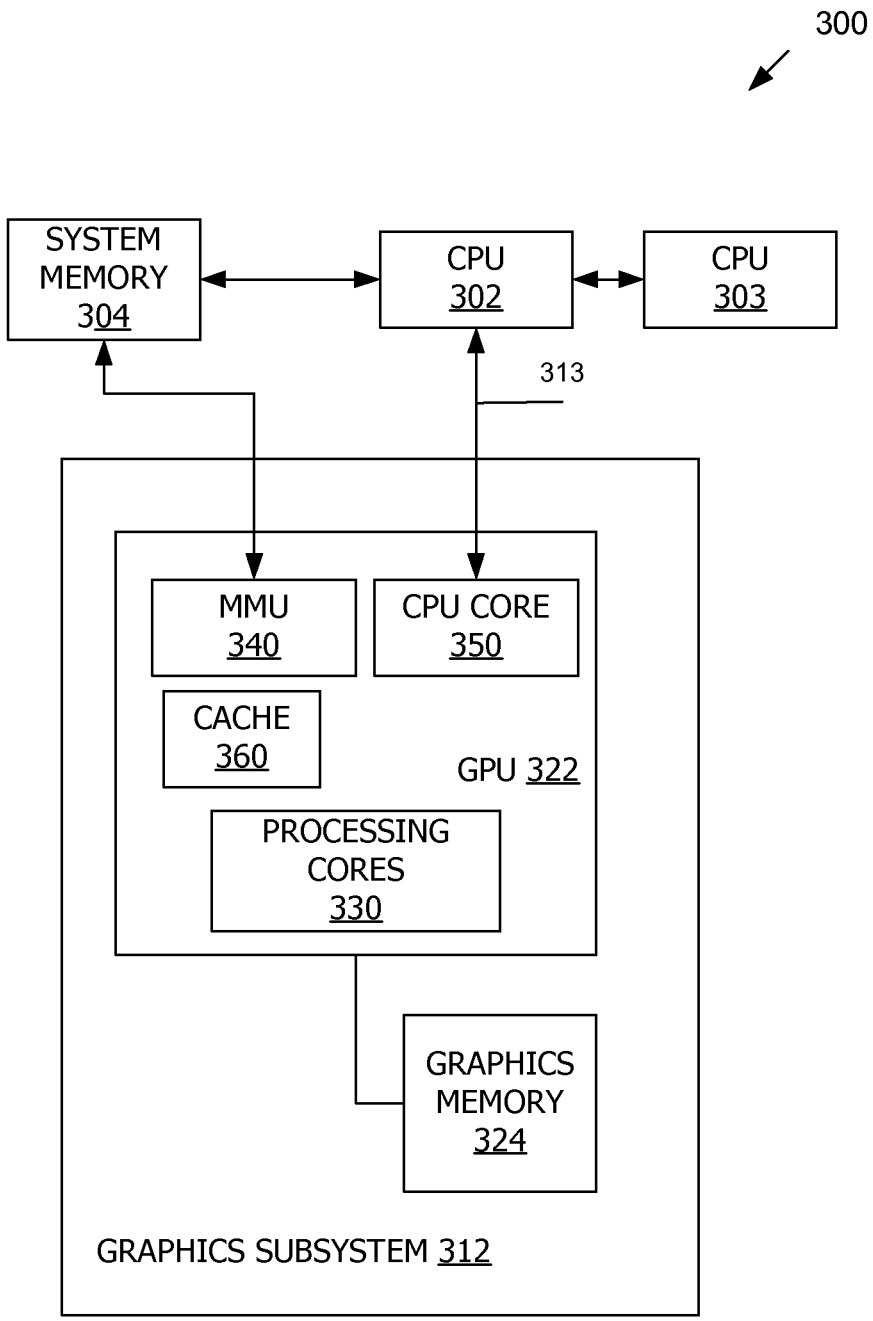
FIG. 3 is a generalized block diagram showing interfaces between one or more CPUs and a GPU in a computer system, according to an embodiment of the present invention.

FIG. 3 is a generalized block diagram showing interfaces between one or more CPUs and GPU 322 in a computer system 300, according to an embodiment of the present invention. Various conventional I/O devices (e.g., system disk, add-in cards, and associated interfaces) are omitted from FIG. 3 for the sake of clarity to focus on processor interfaces in computer system 300.

In this embodiment, one or more CPUs (CPU 302 and optional CPU 303) may comprise any commercially available processor configured to be tightly coupled to other processors. For example, CPU 302 may comprise an AMD Opteron processor, but other commercially available processors may be used, as described with respect to FIG. 2. CPU 302 is coupled to system memory 304 (e.g., DRAM) through an integrated memory controller (not shown). In addition, CPU 302 is connected through a natively implemented Hyper-Transport link (not shown) to a high performance I/O subsystem (not shown). Although not shown, CPU 302 may be connected to other CPUs through direct processor links or interfaces such as HyperTransport, which allows support of a cache-coherent multi-CPU memory access protocol.

Although the present embodiment is described as utilizing AMD Opteron processors and HyperTransport interfaces, persons of ordinary skill in the art will recognize that there are a number of processors and interfaces (e.g., an Intel CSI interface) that provide similar functionality that may be utilized to advantage based upon the present disclosure.

As depicted in FIG. 3, graphics subsystem 312 includes high performance graphics memory 324 coupled to GPU 322. In addition, GPU 322 includes, in addition to one or more processing cores 330, an x86-compatible MMU 340, cache 360, and CPU core 350. CPU core 350 comprises a portion of a conventional CPU core, configured to provide memory management functions in conjunction with MMU 340.

As described in co-pending applications incorporated by reference herein, GPU 322 may comprise a massively parallel multithreaded machine that includes a number of processing cores 330 configured to execute multiple concurrent threads. However, GPU 322 may comprise a variety of processing architectures, including any sequential single processors, parallel processors, or multithreaded processors.

CPU core 350 is configured to execute an operating system (OS) such as Microsoft Windows or Linux. CPU core 350 thus may directly interface GPU 322 to CPU 302 via processor link 313 (e.g., HyperTransport). Typically, CPU core 350 comprises approximately 10 mm² on the chip (die) of GPU 322 as compared to a total size for GPU 322 of approximately 300 mm². Of course, there can be other variations and modifications. For example, in a specific emodiment, GPU 322 may have a size of approximately 450 mm² when fabricated in a 90 nm technology.

GPUs conventionally do not utilize true caches such that the latest copy of any data can reside in the cache. In addition, GPUs conventionally have many disparate locations of RAM on chip for storing data, but the locations of RAM are not coherent even among themselves. Typically, data is assumed valid (i.e. no validation takes place), and software is tasked with explicitly invalidating the data when it is no longer valid.

In one embodiment of the invention, a cache is implemented as strictly read-only. Such a cache may be useful for read-only structures, such as texture maps or constants. Such a cache reduces memory latency and can also deal with invalidations, since state versions are pipelined through the processor. Therefore, portions of the read-only cache are invalidated as state versions change.

According to another embodiment of the present invention, Cache 360 in GPU 322 is configured as a true "data cache" using a true load/store (LD/ST) model, which allows writes and stores to be cached. In a specific embodiment, Cache 360 is configured to be cache coherent with caches (not shown) utilized by CPU 302. In another embodiment, Cache 360 has its coherence managed by hardware through various levels of the cache hierarchy. Thus, graphics subsystem 312 unifies on-chip storage locations in cache 360 as a true cache structure according to an embodiment of the invention.

In some embodiments, GPU 322 has multiple parallel processing cores 330, each capable of supporting multiple concurrent threads. The threads are advantageously executed in SIMD (single instruction, multiple data) groups, with one thread of the group being associated with each processing engine. A single instruction unit issues an instruction to an entire SIMD group in parallel, and each processing engine 330 executes the instruction in the context of its thread of the current SIMD group; instructions for different SIMD groups can be issued in any order. By executing each instruction in the appropriate context, each processing engine 330 executes one thread in each of multiple concurrent SIMD groups.

In some embodiments, CPU core 350 is x86-compatible so that graphics subsystem 312 may run an OS image. In some embodiments, CPU core 350 executes Linux as an OS, where the OS is configured to work with multiple compatible CPUs of different performance levels. In other embodiments, CPU core 350 is not x86-compatible, thus resulting in a heterogeneous multiprocessor system where GPU 322 runs a different OS (such as a real time operating system or RTOS, with a small memory footprint). In such embodiments, services provided on GPU 322 could be accessible via standard mechanisms employed in distributed computing, such as remote procedure calls (RPC).

Because GPU 322 includes CPU core 350, GPU 322 may be treated as if it were a peer to CPU 302 in computer system 300. Processing cores 330 of GPU 322 can directly access shared memory space in system memory 304 and can share virtual memory space allocations with CPU 302 using MMU 340. Further, by configuring cache 360 in GPU 322 to be cache coherent with caches utilized by CPU 302 in computing system 300, data may be readily shared by GPU 322 and CPU 302 in computing system 300. Accordingly, GPU 322 may provide general-purpose computations shared with CPU 302 in the computing system as an equal partner or peer.

In some embodiments, CPU 302 and system memory 304 may be housed on a motherboard inside computer system 300. Further, in some embodiments GPU 322 is configured to mount in a conventional Opteron socket that may be mounted on the motherboard. Providing GPU 322 in a form that is compatible with an Opteron socket meets the needs of system integrators, and enables a relatively high-performance link 313 between GPU 322 and CPU 302. For example, as compared to the embodiments described above with respect to FIG. 2, providing GPU 322 in a form that is compatible with an Opteron socket provides a relatively high performance link 313 between GPU 322 and CPU 302.

Generally, an Opteron socket is limited to about 120 Watts of power consumption, and the form factor might be too small to provide much local memory coupled to GPU 322. The HTX connector allows for daughter cards drawing more power (e.g. 200 W), and carrying several GB of fast memory, but at an additional cost for motherboard manufacturers.

Advantageously, as compared to the configuration described with respect to FIG. 2, computer system 300 provides a higher degree of integration, consumes less space than computer system 200, and provides full cache coherence protocols.

Figure 4:
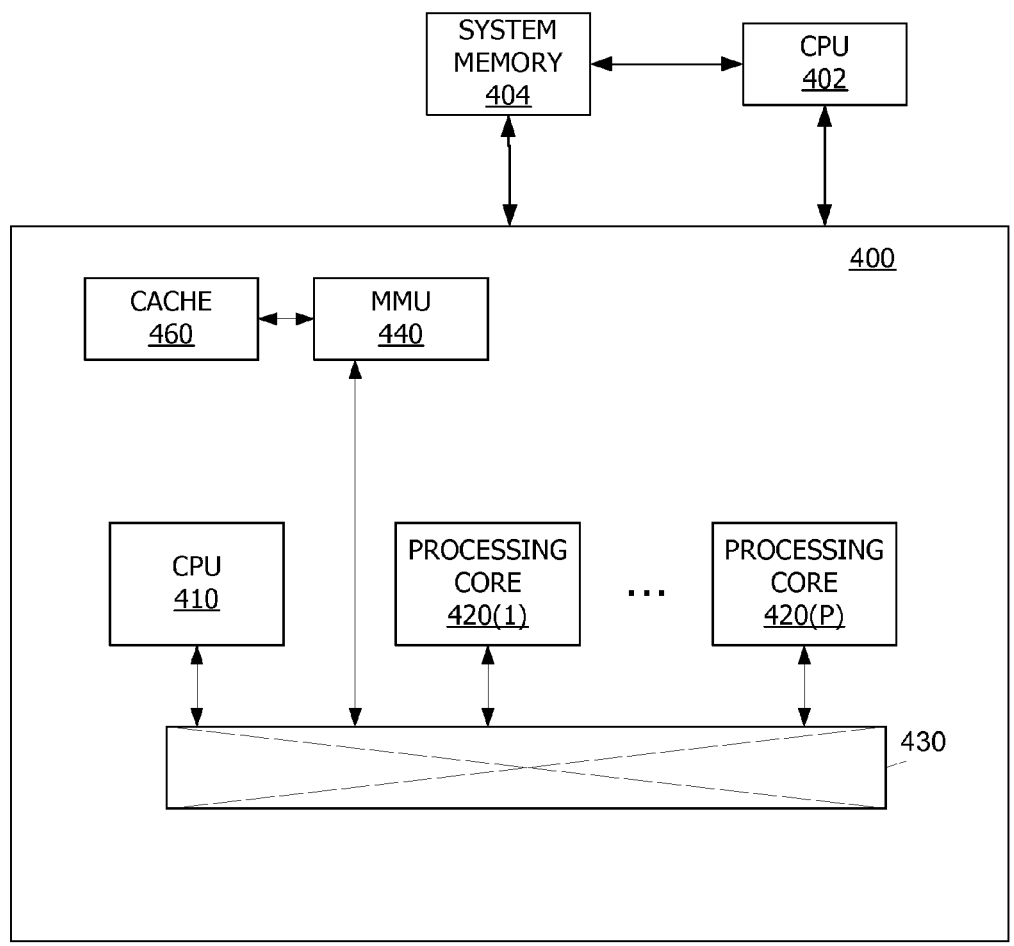
FIG. 4 is a generalized block diagram showing a system on chip (SOC) including one or more CPUs and GPU processing engines, according to an embodiment of the present invention.

FIG. 4 is a generalized block diagram showing a system on chip (SOC) 400 including one or more CPUs 410 and GPU processing cores 420 in an integrated circuit, according to an embodiment of the present invention. Various conventional I/O devices (e.g., system disk, add-in cards, and associated interfaces) conventionally included in a computer system are omitted from FIG. 4 for the sake of clarity to focus on processor interfaces in SOC 400.

In this embodiment, one or more CPUs (CPU 410 and optional other CPUs not shown) are included in SOC 400 and are configured to be tightly coupled to processing cores 420 by crossbar 430. Crossbar 430 can couple CPU 410 and processing cores 420 to MMU 440. Further, CPU 410 and processing cores 420 may share space in cache 460 and/or system memory 404.

Because SOC 400 includes CPU 410, SOC 400 may be treated as if it were a peer to any other CPU such as CPU 402 external to SOC 400. SOC 400 can directly access shared memory space in system memory 404, and can share virtual memory space allocations with other CPUs such as CPU 402. Further, by configuring cache 460 to be cache coherent with caches utilized by other CPUs, data may be readily shared between processing cores 420 and CPU 402.

Advantageously, as compared to the configurations described above, SOC 400 provides an even higher degree of integration, consumes less space, and provides full cache coherence protocols.

Exemplary architectures and techniques are provided herein for a GPU with memory management functions and/or cache coherence mechanisms. However, the systems and methods disclosed herein for are not limited to any particular processing architecture. For example, in some embodiments the architecture of the GPU includes a hierarchical arrangement for parallel processing of threads (lowest level), single-instruction multiple data (SIMD) groups of a number (e.g. 16) of threads, and cooperative thread arrays (CTAs) of a number of threads (higher level), but the techniques described herein may also be applied to processing of threads in non-hierarchical or "flat" arrangement.

Although the invention has been described with respect to specific embodiments, it will be appreciated that the invention is intended to cover all modifications and equivalents within the scope of the following claims.

What is claimed is:

1. A graphics processor comprising:
one or more processing engines configured to execute one or more general-purpose computation programs;
a memory management unit configured to couple the graphics processor to a memory;
a core configured to execute an operating system, the operating system configured to control the memory management unit and allocate memory space to the one or more general-purpose computation programs; and
a cache coupled to the memory management unit, the cache configured to be coherent with a cache of a central processing unit coupled to the graphics processor.

2. The graphics processor of claim 1 wherein the operating system is based upon Linux.

3. The graphics processor of claim 1 wherein the operating system is based upon Microsoft Windows.

4. The graphics processor of claim 1 wherein the memory management unit is compatible with an x86 architecture.

5. The graphics processor of claim 1 wherein the graphics processor is configured to interface with a socket for an Opteron processor.

6. The graphics processor of claim 1 wherein the graphics processor is multithreaded.

7. The graphics processor of claim 1 wherein the graphics processor is multithreaded.

8. A system comprising:
a central processing unit;
a memory coupled to the central processing unit; and
a graphics processor coupled to the memory, the graphics processor including:
one or more processing engines configured to execute one or more general-purpose computation programs;
a memory management unit configured to couple the graphics processor to the memory; and
a core configured to execute an operating system, the operating system configured to allocate space in the memory to the one or more general-purpose computation programs,
wherein the central processing unit includes a first cache and the graphics processor further includes a second cache, the second cache comprising a snooping cache.

9. The system of claim 8 wherein the central processing unit and the graphics processor are configured to share a virtual memory address space mapped to the memory.

10. The system of claim 8 wherein the central processing unit is configured to execute a first operating system and the graphics processor is configured to execute a second operating system.

11. The system of claim 8 wherein the central processing unit comprises an Opteron processor.

12. The system of claim 8 further comprising a HyperTransport link, wherein the graphics processor is configured to communicate with the central processing unit via the HyperTransport link.

13. The system of claim 12 wherein the central processing unit is coupled via a socket to a motherboard and the graphics processor is operatively mounted on a daughterboard, wherein the daughterboard is operatively coupled to the motherboard with an HTX connector.

14. The system of claim 13 wherein the daughterboard includes a bridge between the graphics processor and the HyperTransport link.

15. The system of claim 8 wherein the central processing unit and the graphics processor are included in a system on chip.

* * * * *